(12) United States Patent
Harvey et al.

(10) Patent No.: US 10,062,400 B1
(45) Date of Patent: Aug. 28, 2018

(54) MODE SPLITTER BETWEEN TE AND TM POLARIZATION FOR HEAT-ASSISTED MAGNETIC RECORDING

(71) Applicant: Seagate Technology LLC, Cupertino, CA (US)

(72) Inventors: Christopher Neil Harvey, Derry (GB); Aidan Dominic Goggin, Donegal (IE); Kelly Elizabeth Hamilton, Derry (GB); Reyad Mefuz, Derry (GB)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/658,636

(22) Filed: Jul. 25, 2017

(51) Int. Cl.
- *G11B 11/00* (2006.01)
- *G11B 5/48* (2006.01)
- *G11B 5/00* (2006.01)
- *G11B 5/60* (2006.01)
- *G11B 7/126* (2012.01)

(52) U.S. Cl.
CPC .......... *G11B 5/4866* (2013.01); *G11B 5/6088* (2013.01); *G11B 7/126* (2013.01); *G11B 2005/0021* (2013.01)

(58) Field of Classification Search
USPC .... 369/13.01–13.55, 112.09, 112.14, 112.21, 369/112.27, 300; 360/59, 123.02–125.75, 360/131; 385/11–14, 31, 88–94, 385/123–132, 141–145; 29/603.07–603.27
See application file for complete search history.

(56) References Cited

U.S. PATENT DOCUMENTS

| | | | |
|---|---|---|---|
| 9,123,374 B1 * | 9/2015 | Tohmon | G11B 5/4866 369/13.33 |
| 9,424,867 B2 | 8/2016 | Peng | |
| 9,659,591 B1 * | 5/2017 | Peng | G11B 5/4866 369/13.33 |
| 9,786,314 B1 * | 10/2017 | Peng | G11B 13/08 369/13.33 |
| 2013/0108212 A1 * | 5/2013 | Peng | G02B 6/4215 369/13.33 |
| 2014/0153861 A1 * | 6/2014 | Peng | G02B 6/126 369/13.32 |

(Continued)

OTHER PUBLICATIONS

Dai et al., "Novel ultra-short and ultra-broadband polarization beam splitter based on a bent directional coupler", Optics Express, Vo. 19, No. 19, Sep. 12, 2011, 7 pages.

(Continued)

*Primary Examiner* — Tan X Dinh

(74) *Attorney, Agent, or Firm* — Hollingsworth Davis, LLC

(57) ABSTRACT

An apparatus includes a first waveguide core extending along a light-propagation direction and configured to receive light from a light source at a combined transverse electric (TE) mode and a transverse magnetic (TM) mode. A second waveguide core is spaced apart from the first waveguide core and is configured to couple light at a TM mode to the second waveguide core. A near-field transducer (NFT) is disposed at a media-facing surface of a write head, the NFT receiving the light from the first waveguide core or the second waveguide core and heating a magnetic recording medium in response thereto.

20 Claims, 11 Drawing Sheets

(56) References Cited

U.S. PATENT DOCUMENTS

| | | | | |
|---|---|---|---|---|
| 2015/0016234 A1* | 1/2015 | Itagi | ............ | G11B 5/6088 369/13.33 |
| 2015/0122772 A1* | 5/2015 | Clinton | ............ | G11B 5/314 216/22 |
| 2015/0279394 A1* | 10/2015 | Peng | ............ | G02B 6/14 369/13.32 |
| 2016/0133285 A1* | 5/2016 | Peng | ............ | G02B 6/1226 369/13.33 |
| 2016/0379677 A1* | 12/2016 | Van Orden | ............ | G11B 5/6088 369/13.33 |

OTHER PUBLICATIONS

Zhang et al., "Ultra-compact and highly efficient silicon polarization splitter and rotator", Apl Photonics 1, 2016, 6 pages.

* cited by examiner

MODE SPLITTER BETWEEN TE AND TM POLARIZATION FOR HEAT-ASSISTED MAGNETIC RECORDING

SUMMARY

Embodiments described herein involve an apparatus comprising a first waveguide core extending along a light-propagation direction and configured to receive light from a light source at a combined transverse electric (TE) mode and a transverse magnetic (TM) mode. A second waveguide core is spaced apart from the first waveguide core and is configured to couple light at a TM mode to the second waveguide core. A near-field transducer (NFT) is disposed at a media-facing surface of a write head, the NFT receiving the light from the first waveguide core or the second waveguide core and heating a magnetic recording medium in response thereto.

A method involves receiving light from a light source at a combined transverse electric (TE) mode and a transverse magnetic (TM) mode. TM mode light is coupled to a second waveguide core from the first waveguide core, the second waveguide core spaced apart from the first waveguide core. Light received from the first waveguide core or the second waveguide core is delivered to a near-field transducer (NFT) at a media-facing surface of a write head. A magnetic recording medium is heated in response to delivering the light.

Embodiments described herein involve an apparatus comprising a first waveguide core extending along a light-propagation direction and configured to receive light from a light source at a combined transverse electric (TE) mode and a transverse magnetic (TM) mode. A second waveguide core is spaced apart from the first waveguide core and is configured to couple light at a TM mode to the second waveguide core from the first waveguide core. A near-field transducer (NFT) is disposed at a media-facing surface of a write head, the NFT receiving substantially TM mode light from the second waveguide core and heating a magnetic recording medium in response thereto.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure is generally directed to read-write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region exceeding the Curie temperature having dimensions less than 100 nm.

Figure 1:
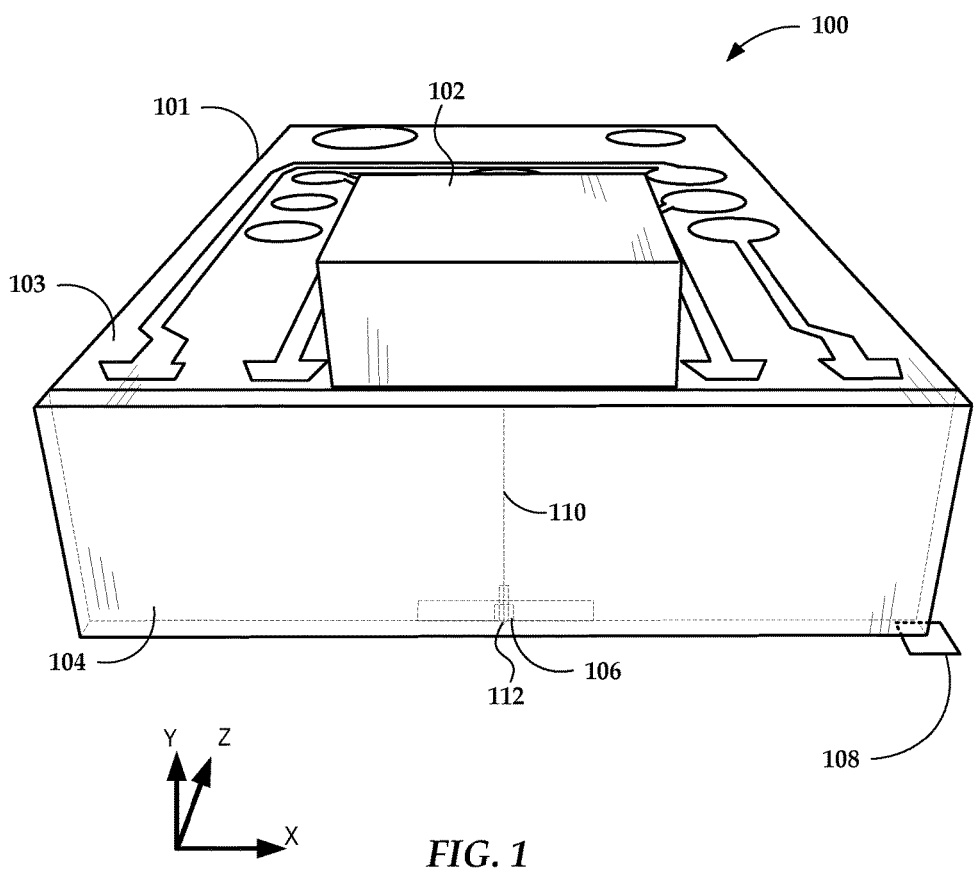
FIG. 1 is a perspective views of a hard drive slider that includes a waveguide system in accordance with embodiments described herein.

In reference to FIG. 1, a perspective view shows a HAMR slider assembly 100 according to an example embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, such as waveguide system 110, are formed integrally within the slider body 101 (near a trailing edge surface 104 in this example) and function as an optical path that delivers energy from the laser diode 102 to the recording media via a near-field transducer (NFT) 112. The NFT 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide system discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide. Embodiments described herein may be applicable to a system in which at least part of a semiconductor laser or material to form a laser (e.g., epitaxial layer) is not self-supporting (e.g., not a separately packaged device) but is physically transferred to a target read/write head substrate that does contain already or will contain, after further processing, the other components of the read/write head (e.g., write coil and poles, reader stack) without the use of a separate or intermediate support during attachment.

Figure 2:
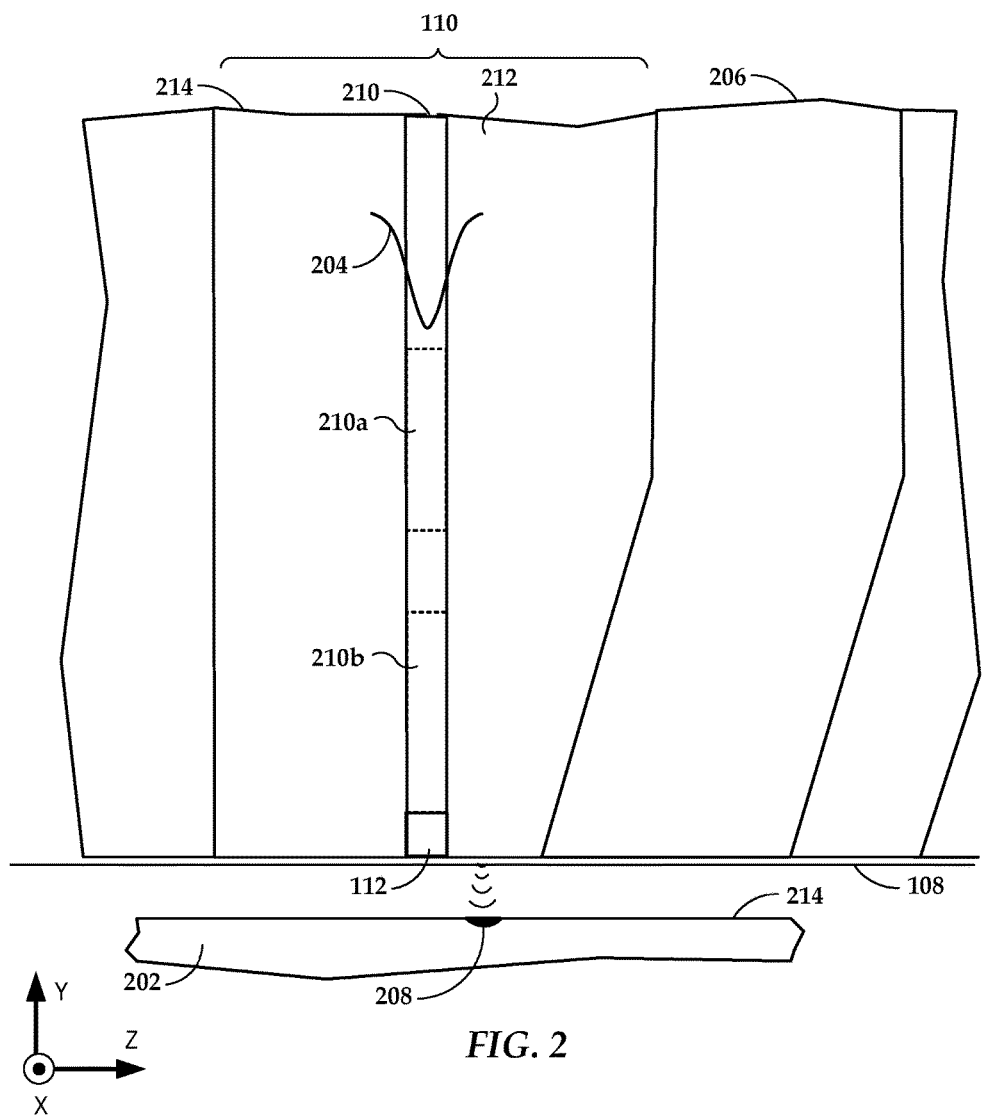
FIG. 2 is a cross-sectional view that shows details of a HAMR apparatus in accordance with embodiments described herein.

In reference now to FIG. 2, a cross-sectional view shows details of a HAMR apparatus according to an example embodiment. NFT 112 is located proximate a media-facing surface 108 (e.g., ABS), which is held near a magnetic recording media 202 during device operation. In the orientation of FIG. 2, the media-facing surface 108 is arranged parallel to the x-z plane. A waveguide system 210 may be disposed proximate the NFT 112, which is located at or near the media writing surface 214. The waveguide system 210 may include a mode converter 210a. The mode converter 210a may be configured to convert an input mode of light into a different mode or modes of light. In some cases, the mode converter 210a may be configured to receive a TE mode from the laser diode 102 and be configured to convert the light into a substantially TM mode or a combined TE and TM mode. According to various embodiments, the mode converter 210a may be configured to receive a TM mode from the laser 102 and be configured to convert the light into a substantially TE mode or a combined TE and TM mode. According to various embodiments, the mode converter 210a may be configured to receive a combined TE and TM mode and convert the light to substantially a TE mode, substantially a TM mode, or a combined TE and TM mode having a different ratio of TE mode and TM mode light than what was input into the mode converter 210a.

The mode purity of the light output from the mode converter may be imperfect. For example, in a system in which the mode converter converts the light into substantially TM mode light the mode purity of the light may be about 95% TM light and 5% TE light. In some cases, the shape of the waveguide may cause the mode of the light to become impure. Filtering the imperfect mode light may be useful to further refine the mode before the light is delivered to the NFT. The mode converted light may be input into a mode filter 210b that may be used to further refine the light mode that is directed to the NFT. The mode filter region of the waveguide may include one or more waveguide cores. In some cases, one or both of the waveguide cores comprises TaOx.

The waveguide system 210 is surrounded by cladding layers 212, 214. The waveguide system 210 and cladding layers 212, 214 may be made from dielectric materials such as $Al_2O_3$, $SiO_xN_y$, $SiO_2$, $Ta_2O_5$, $TiO_2$, $ZnS$, $SiN_x$, $Nb_2O_5$, $AlN$, $Hf_2O_3$, $Y_2O_3$, $AlO_x$, etc. Generally, the dielectric materials are selected so that the refractive index of at least one of the waveguide cores of the waveguide system is higher than refractive indices of the cladding layers 212, 214. This arrangement of materials facilitates efficient propagation of light through the waveguide. Light is delivered from the waveguide system 210 along the negative y-direction where it is coupled to the NFT 112. The NFT 112 delivers surface plasmon enhanced, near-field electromagnetic energy along the y-axis where it exits at the media writing surface 214. This may result in a highly localized hot spot 208 on the media surface 214 when the media 202 placed in close proximity to surface 108 of the apparatus. Further illustrated in FIG. 2 is a recording pole 206 of the read/write head that is located alongside the NFT 112. The recording pole 206 generates a magnetic field (e.g., perpendicular field) used in changing the magnetic orientation of the hotspot during writing.

The energy 204 may be coupled into the waveguide system 210 at a combined transverse electric (TE) mode and transverse magnetic (TM) mode. In some cases, the energy 204 is coupled into the waveguide system 210 at a combined fundamental TE ($TE_{00}$) mode and fundamental TM ($TM_{00}$) mode. According to various embodiments, the waveguide system 210 comprises two separate waveguide cores that are used to separate the $TE_{00}$ mode light and the $TM_{00}$ mode light. Light is the output from the waveguide system 210 in separated beams via the respective waveguide cores.

In some cases, the NFT 112 is a part of the waveguide system 210. In this embodiment, the waveguide may function as a waveguide and an NFT. This type of waveguide may be referred to herein as a "plasmonic gap waveguide," a "gap waveguide," and/or an "aperture waveguide." The plasmonic gap waveguide is based on the optical coupling between two surface plasmon polaritons (SPPs) that propagates in each of the interfaces between the waveguide core and the cladding layers. The plasmonic gap waveguide may be excited by injecting an electric TM and/or TE mode into the waveguide. The reduction of the width and gap separation between the layers can be adjusted to shape the thermal spot size and the thermal gradient in the magnetic recording media. According to various embodiments, a plasmonic gap waveguide comprises a dielectric core placed between two separated metallic stripes forming a metallic-dielectric-metallic sandwich where the two SPPs propagating in the interfaces dielectric-metal are coupled confining the electric field around the gap.

Figure 3A:
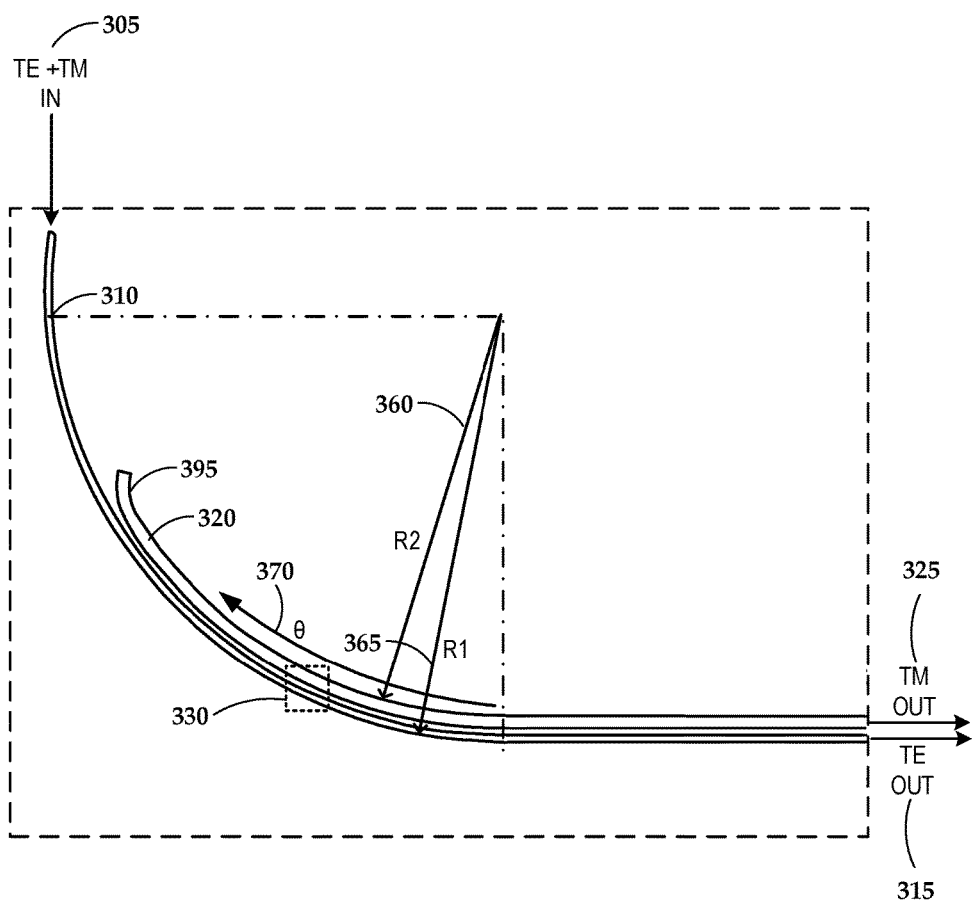
FIGS. 3A and 3B waveguide systems having two waveguide cores in accordance with embodiments described herein.
Figure 3B:
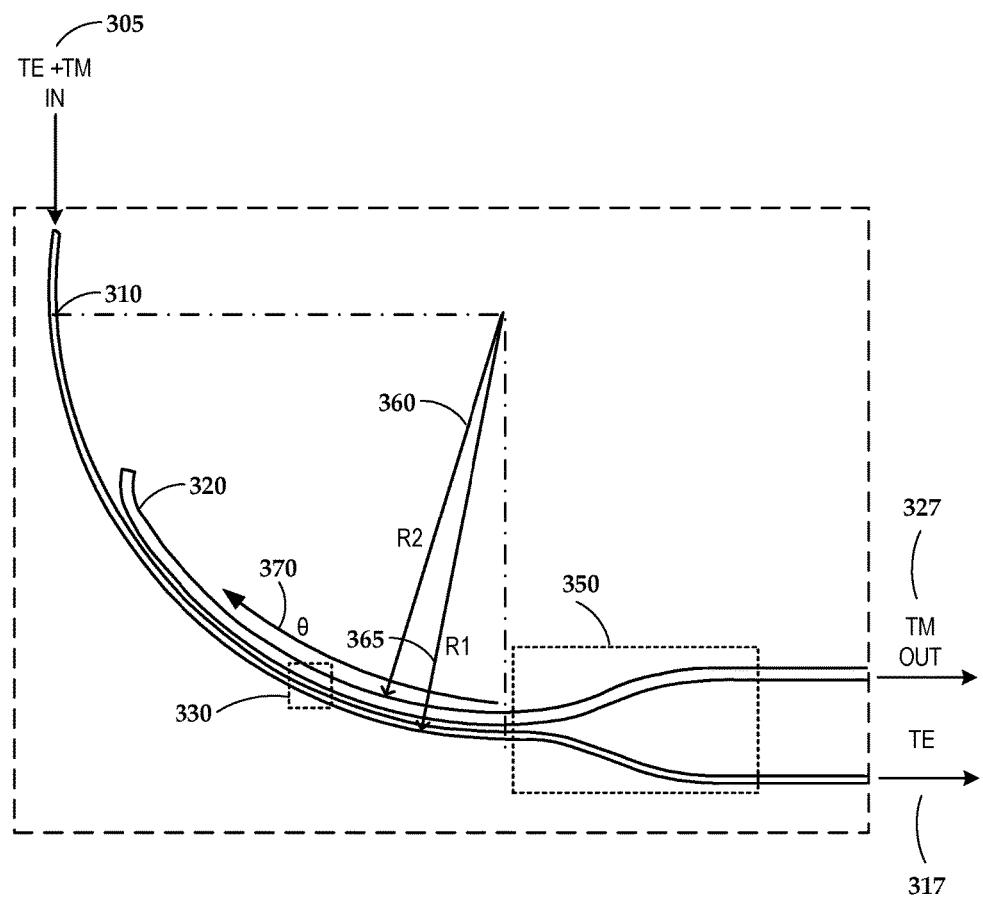

FIGS. 3A and 3B illustrate detailed views of the mode filter 210b of waveguide systems having two waveguide cores in accordance with various embodiments. Mixed mode light is input 305 into the system in the first waveguide core 310. According to various implementations, the mixed mode light is mixed TE and TM light. According to various implementations, the input light is about 95% TM mode light and about 5% TE mode light. According to various embodiments, the system may be configured to receive multiple modes of light. For example, the system may be configured to receive mixed mode light, substantially TE mode light, and or substantially TM mode light. As the light travels through the system, a second waveguide core 320 is disposed adjacent to the first waveguide core 310 as shown in FIGS. 3A and 3B. The second waveguide core 320 may include a curved lip feature 395 at an initial end to reduce scattering of the light.

At least one of the first waveguide core 310 and the second waveguide core 320 may comprise a curved region. At least a portion of the second waveguide core 320 may follow the general curve of the first waveguide core 310. The mixed mode light travels through the first waveguide core 310 and the TM mode light present in the mixed mode light begins to couple to a second waveguide core 320 at a coupling region of the waveguide system. The TE mode light remains in the first waveguide core 310. Once the TM mode light is coupled to the second waveguide core 320, the first waveguide core 310 comprises substantially TE mode light and the second waveguide core 320 comprises substantially TM mode light. The light then exits the waveguide system in substantially a TE mode light 315, 317 from the first waveguide core 310 or substantially TM mode light 325, 327 from the second waveguide core 320. In some cases, the TM mode light is delivered to the NFT from the second waveguide core 320 and TE mode light in the first waveguide core 310 is dumped in a location other than the NFT to avoid delivering TE mode light to the NFT. In some embodiments, TE mode light is delivered to the NFT from the first waveguide core 310 and TM mode light in the second waveguide core 320 is dumped in a location other than the NFT to avoid delivering TM mode light to the NFT.

According to various configurations, light in the first waveguide core 310 after the coupling region is at least 90% TE mode light and/or the light in the second waveguide core 320 after the coupling region is at least 90% TM mode light. In some cases, the light in the first waveguide core 310 is at least 95% TE mode light and/or the light in the second waveguide core 320 is at least 95% TM mode light. In some cases, the mode purity is at least 97% in one or both of the first and second waveguide cores 310, 320.

Figure 4:
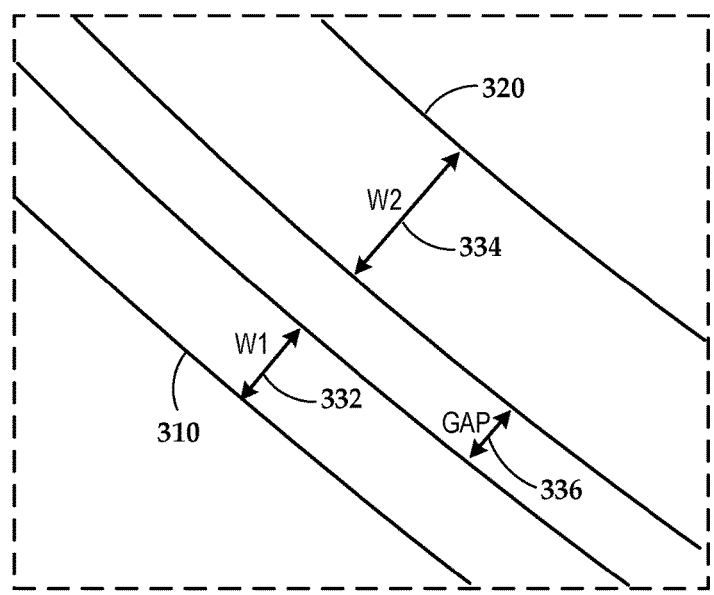
FIG. 4 illustrates a more detailed view of waveguide systems having two waveguide cores in accordance with embodiments described herein.

The coupling of the specific light mode to the respective waveguide core may depend on the widths of the respective waveguide cores. FIG. 4 illustrates a more detailed view of the waveguide cores 310, 320 at the location of box 330 shown in FIG. 3B. As this section, the first waveguide core 310 has a first width, W1, 332 and the second waveguide core has a second width, W2, 334. According to various embodiments, W1 is in a range of about 250 nm to about 400 nm or in a range of about 300 nm to about 360 nm. According to various implementations, W1 is about 330 nm. W2 may be in a range of about 500 nm to about 650 nm or in a range of about 540 nm to about 600 nm. According to various implementations, W2 is about 570 nm or about 590 nm. A gap 336 is disposed between the first waveguide core 310 and the second waveguide core 320. The width of the gap 336 may be in a range of about 200 nm to about 300 nm or in a range of about 230 nm to about 270 nm. In some cases the width of the gap 336 is about 250 nm. In some cases, the width of the gap 336 increases along the light propagation direction for at least a portion of the waveguide length as shown in FIG. 3B. While, FIG. 4 shows an example in which the W1 332 is less than W2 334, it is to be understood that W1 may be substantially equal to W2. In some cases, W1 is greater than W2.

Turning back to FIGS. 3A and 3B, the bending radius, R1, 365 of the first waveguide core 310 and the bending radius, R2, 360 of the second waveguide core 320 may be determined based of the respective widths 332, 334, of the first waveguide core 310 and the second waveguide core 320. Equation 1 illustrates the relationship between the bending radii 360, 365, W1 332, W2 334, and the gap 336.

$$R2 = R1 - \left(\frac{W2}{2} + \text{gap} + \frac{W1}{2}\right) \qquad \text{Equation 1}$$

According to various implementations, in order to have coupling for a given mode, the optical path lengths (OPLs) may be equal. Equation 2 shows the relationship of the optical path length to R1 365 and R2 360.

$$OPL = \frac{2\pi}{\lambda} R_2 \theta n_2 = \frac{2\pi}{\lambda} R_1 \theta n_1 \qquad \text{Equation 2}$$

In this case, λ represents the laser wavelength. In some cases, λ is in a range of about 750 to about 900 nm or in a range of about 800 to about 860 nm. According to various embodiments, λ is about 830 nm. The effective indices of refraction of the first waveguide core 310 (for TE light) and the second waveguide core 320 (for TM light) are represented by n1 and n2, respectively. For example, n1=1.76, n2=1.82. According to various implementations, θ 370 is the arc angle of the TM mode coupling region spanned by the second waveguide core 320. In some cases, θ is about 1 radian. According to various implementations, R1 and R2 are in a range of about 15 μm to about 25 μm. In some cases, R1 is about 20 μm and R2 is about 19.3 μm.

Figure 5:
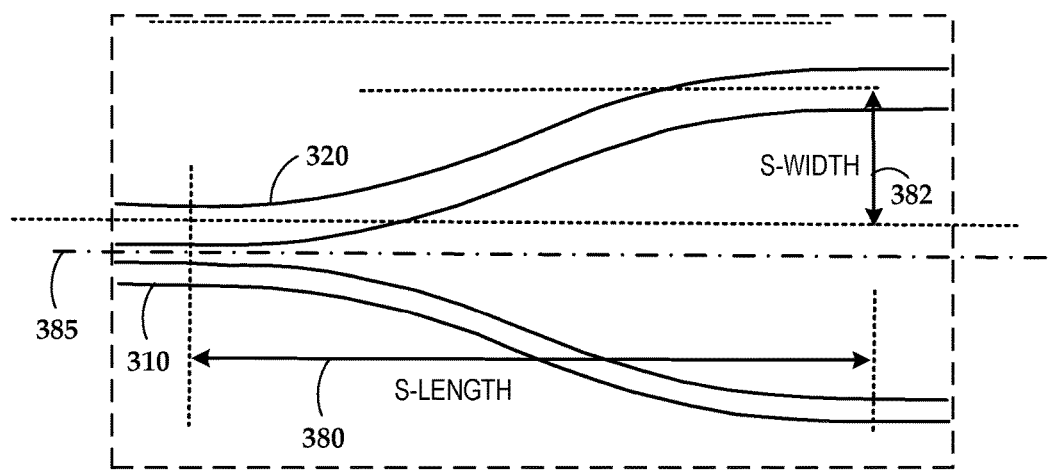
FIG. 5 shows a more detailed view of an s-bend for each of two waveguide cores in accordance with embodiments described herein.

One or both of the first waveguide core 310 and the second waveguide core 320 may comprise an s-bend at a terminal end of the waveguide system. FIG. 3B illustrates a system in which both the first waveguide core 310 and the second waveguide core 320 comprise an s-bend near the terminating end of the waveguide system. FIG. 5 illustrates a more detailed view of the portion of the waveguide system outlined by box 350 in FIG. 3B. FIG. 5 shows that the s-bend for each of the waveguide cores 310, 320 has a length 380 and a width 382. According to various implementations, at least one of the s-bend length 380 and the s-bend width 382 for the first waveguide core 310 is substantially the same as the respective s-bend length 380 and the s-bend width 382 of the second waveguide core 320. In some cases, the s-bend for the second waveguide core 320 is reflected along axis 385 such that the profile of the s-bend for the first waveguide core 310 is a substantial mirror image of the profile of the s-bend of the second waveguide core 320 as shown in FIG. 5. In some cases, the s-bend width and/or the s-bend length of the first waveguide core 310 may be different than the respective s-bend length and/or the s-bend width of the second waveguide core 320. According to various implementations, the s-bend width 382 is in a range of about 1 μm to about 3 μm. In some cases, the s-bend width 382 is about 2 μm. The s-bend length 380 may be in a range of about 5 μm to about 15 μm or in a range of about 8 μm to about 12 μm. In some cases, the s-bend length 380 is about 10 μm.

Figure 6A:
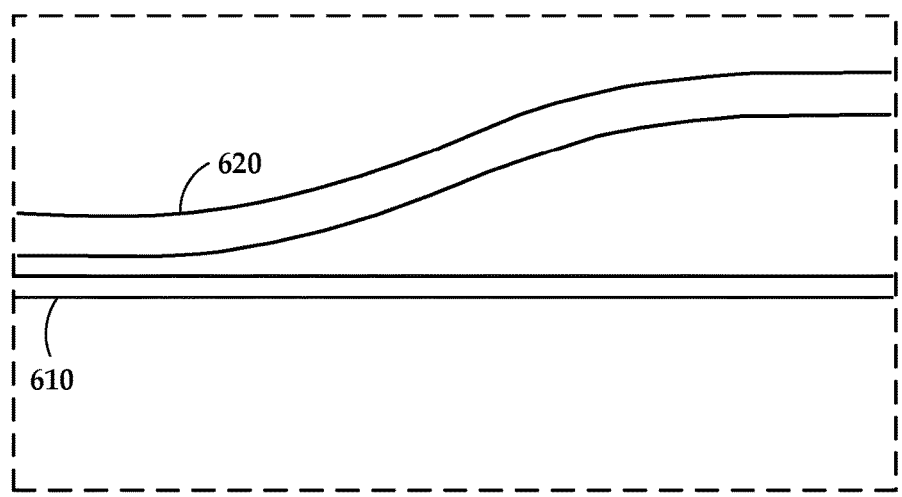
FIGS. 6A-6D illustrate examples of s-bend configurations for a waveguide core in accordance with embodiments described herein.
Figure 6B:
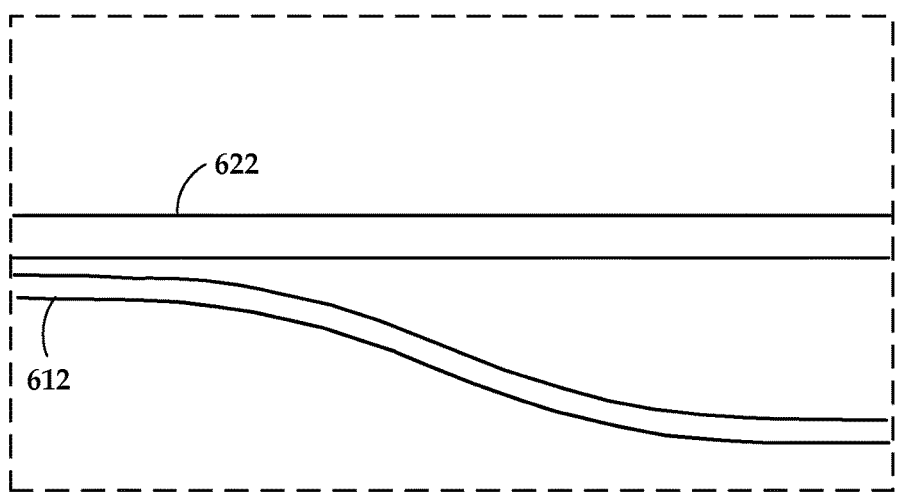

According to various embodiments, one or both of the first waveguide core and the second waveguide core has a different s-bend configuration than what is shown in FIG. 3B and FIG. 5. FIG. 6A shows a configuration in which the first waveguide core 610 does not have an s-bend at the terminating end, but is substantially straight. The second waveguide core 620 in this example has an s-bend similar to what was shown in conjunction with FIGS. 3B and 5. FIG. 6B illustrates another example in which one of the waveguide cores is substantially straight. In this example, the second waveguide core 622 has a substantially straight profile while the first waveguide core 612 has an s-bend similar to what was shown in conjunction with FIGS. 3B and 5.

Figure 6C:
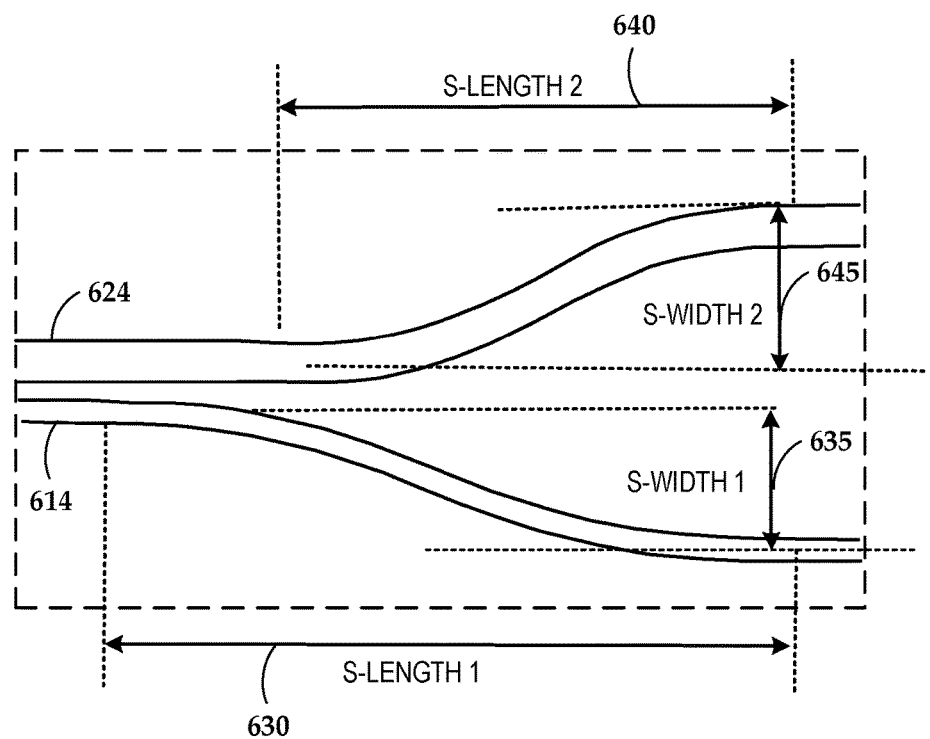
Figure 6D:
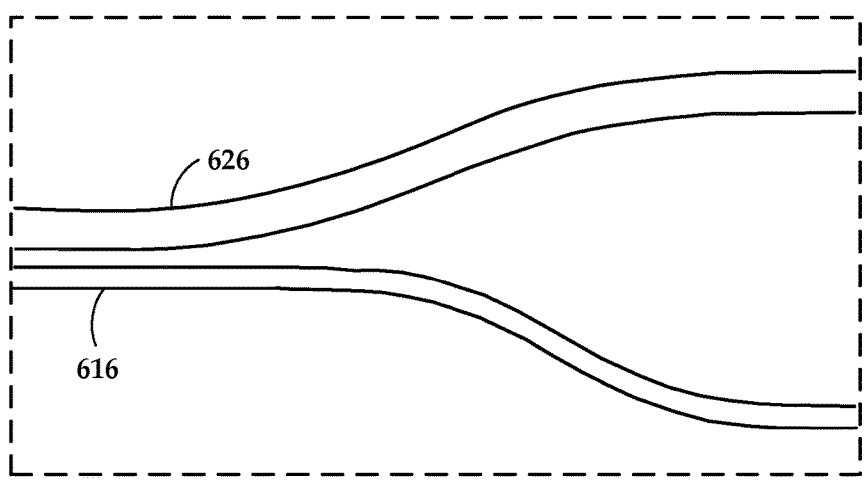

FIGS. 6C and 6D illustrate examples in which both of the first waveguide core and the second waveguide core comprises an s-bend, but the s-bends have different lengths and/or widths. In the example shown in FIG. 6C, the first waveguide core 614 has a first length, s-length 1, 630 and a first width, s-width 1, 635. Similarly, the second waveguide core 624 has a second length, s-length 2, 640 and a second width, s-width 2, 645. FIG. 6C illustrates an embodiment in which the s-length 1 630 is greater than s-length 2 640 and s-width 1 635 is less than s-width 2 645. In some cases, s-length 2 of the second waveguide core 626 is greater than s-length 1 of the first waveguide core 616 and/or s-width 2 of the second waveguide core 626 is less than s-width 1 of the first waveguide core 616 as shown in the example of FIG. 6D. While FIGS. 6C and 6D show examples in which both s-length 1 and s-width 1 are different from the respective s-length 2 and s-width 2, it is to be understood that only one of s-length 1 and s-width 1 may be different from the respective s-length 2 and s-width 2 while the remaining parameters are substantially equal.

FIGS. 3B and 5 illustrate examples in which the s-bend profile of the first waveguide core and the s-bend profile of the second waveguide core are reflected along a central axis, in some cases, the s-bend profile of a waveguide core may follow the s-bend profile of the other waveguide core.

Figure 7A:
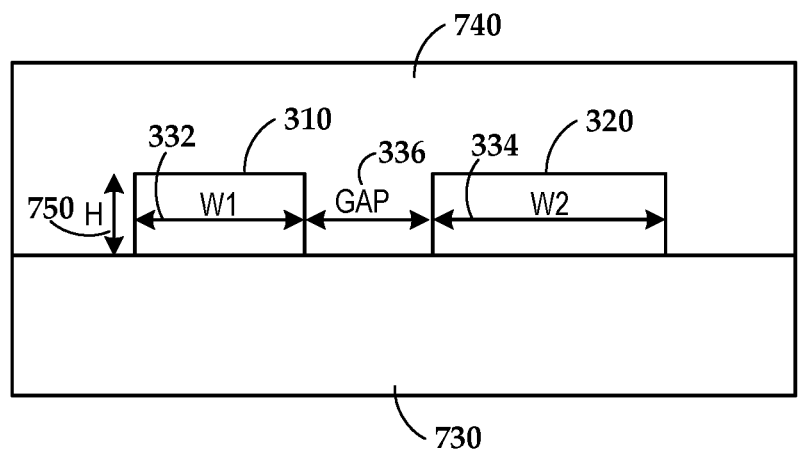
FIGS. 7A-7D illustrate cross-sectional views of a waveguide system having two waveguide cores in accordance with embodiments described herein.

The waveguide system may be surrounded by one or more cladding layers. FIG. 7A illustrates a cross-section of the waveguide system having a first waveguide core 310 and a second waveguide core 320. In addition to the widths of the respective waveguide cores and the gap width between the waveguide cores, the first waveguide core 310 and the second waveguide core 320 have a height H 750. H may be in a range of about 250 nm to about 420 nm or in a range of about 310 nm to about 370 nm. In some cases, H is about 340 nm.

At least one of the first and second waveguide cores 310, 320 are surrounded on a first side by a bottom cladding layer 730 as shown in FIG. 7A. According to various embodiments, the bottom cladding layer comprises $SiO_2$. The waveguide system includes an upper cladding layer 740 that surrounds the remaining sides of the first waveguide core 310 and/or the second waveguide core 320. According to various embodiments, the upper cladding layer 740 comprises $AlO_x$.

Figure 7B:
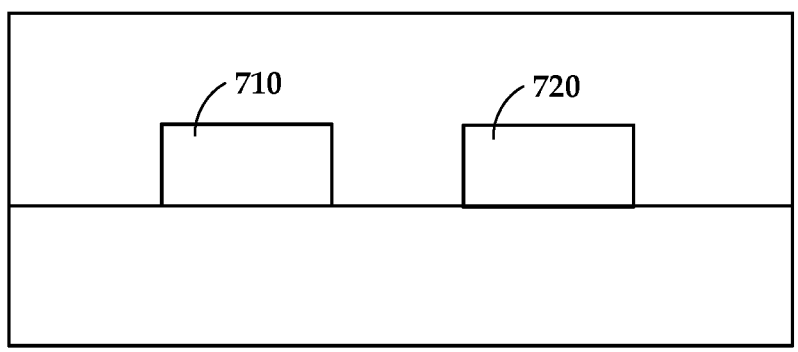
Figure 7C:
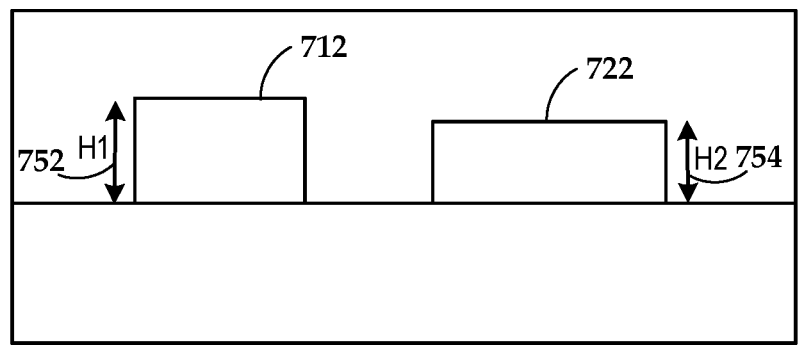
Figure 7D:
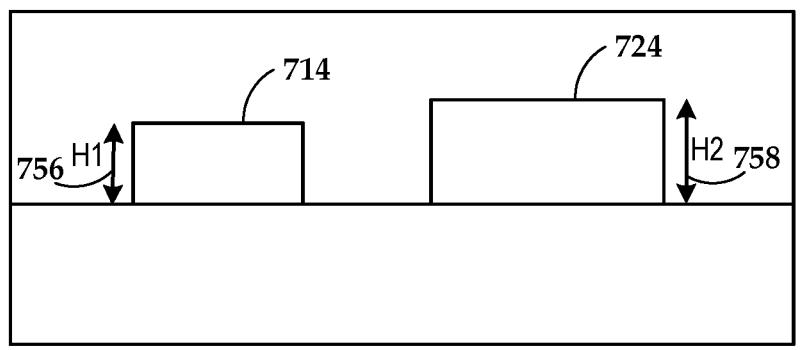

In some cases, the widths of the first waveguide core and the second waveguide core may be about the same value. This is shown in FIG. 7B in which the cross-sectional width of the first waveguide core 710 is substantially equal to the cross-sectional width of the second waveguide core 720. While FIGS. 7A and 7B illustrate embodiments in which the height of the first waveguide core and the height of the second waveguide core are substantially equal, in some cases, the heights of the first and second waveguide cores may be different from each other. FIG. 7C illustrates an embodiment in which the first waveguide core 712 has a first height, H1, 752 and the second waveguide core 722 has a second height H2 754. In this example, H1 752 is greater than H2 754. Similarly, FIG. 7D illustrates an embodiment in which the first waveguide core 714 has a first height, H1, 756 and the second waveguide core 724 has a second height 758. In this example, H1 756 is less than H2 758. Table 1 shows sample values for the various parameters of the waveguide system in accordance with any of the embodiments described herein.

TABLE 1

| Parameter | Value |
| --- | --- |
| W1 | 330 μm |
| W2 | 590 μm |
| gap | 250 μm |
| R1 | 20.0 μm |
| R2 | 19.3 μm |
| height | 340 nm |
| θ | 1 rad |
| s-bend width 1 | 2.0 μm |
| s-bend width 2 | 2.0 μm |
| s-bend length | 10.0 μm |

Figure 8A:
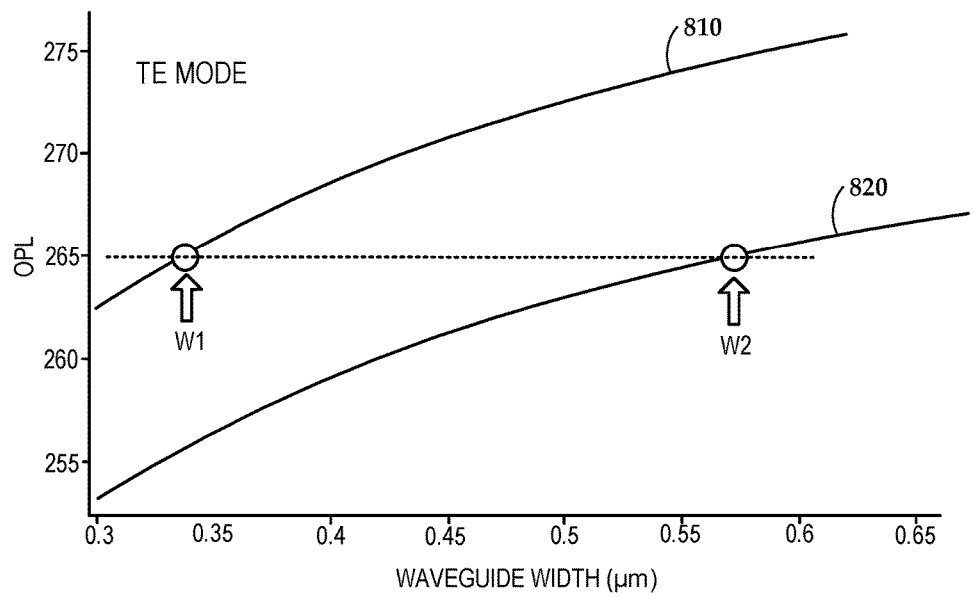
FIG. 8A shows the optical path length (OPL) versus the waveguide core width for a first waveguide core for transverse electric (TE) mode light in accordance with embodiments described herein.
Figure 8B:
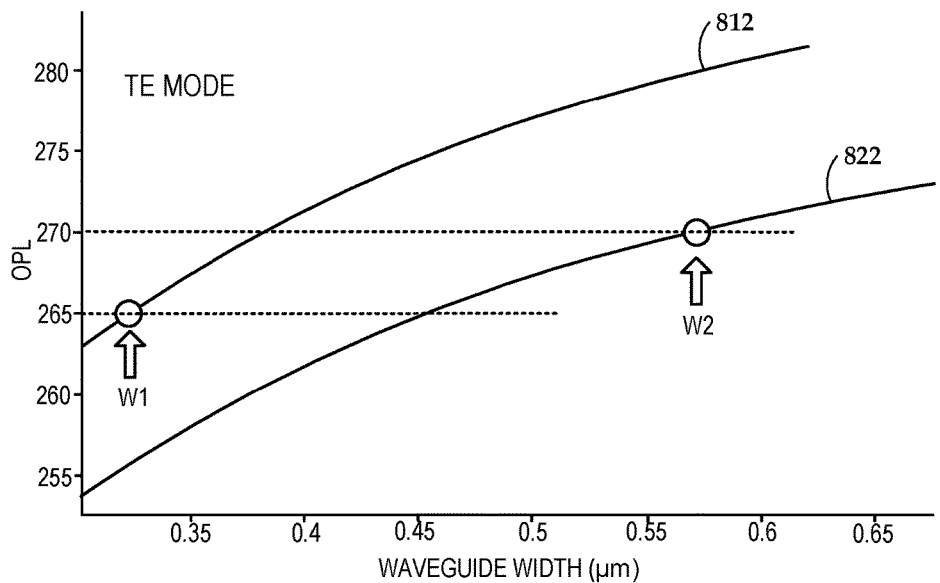
FIG. 8B shows the OPL versus the waveguide core width for a first waveguide core for transverse magnetic (TM) mode light in accordance with embodiments described herein.

According to various embodiments, the parameters of the waveguide system are chosen to provide a phase matching condition for TM coupling so that TM light is coupled into the second waveguide core. Choosing the parameters in this way causes the TM mode light to be coupled into the second waveguide while the TE mode light remains in the first waveguide core. For example, parameters may be chosen such that for TM mode light, the first waveguide core has substantially the same OPL as that of the second waveguide core. For TE mode light, the first waveguide core has a different OPL than that of the second waveguide core. This creates a system in which TM and TE mode light is coupled into the first waveguide core when the mixed mode light is input into the system. TM mode light then couples to the second waveguide core because the second waveguide core has substantially the same OPL value as the first waveguide core. TE mode light remains in the first waveguide core because the second waveguide core has a different OPL than the first waveguide core for TE mode light. FIGS. 8A and 8B show graphs that illustrate determining the respective waveguide core widths based on the OPL values.

FIG. 8A shows the OPL versus the waveguide core width for the first waveguide core 810 and the second waveguide core 820 for TE mode light. FIG. 8B illustrates a graph that shows the OPL versus the waveguide core width for the first waveguide core 812 and the second waveguide core 822 for TM mode light. The first waveguide core and the second waveguide core widths are chosen such that the OPL for TM mode light is the same for both of the waveguide cores while the OPL for TE mode light is different for both waveguide cores. In the example shown in FIGS. 8A and 8B, the OPL is about the same for both cores for the TM mode light when the first waveguide core width is about 330 nm and the second waveguide core width is about 570 nm. According to various embodiments, the width of the second waveguide core is about 580 nm or about 590 nm. For the same widths, the OPL is different for the first core and the second core for TE mode light as shown in FIG. 8B. While the examples shown in FIGS. 8A and 8B show specific values for the first and second waveguide core widths, it is to be understood that the widths may be different values while still providing phase matching such that TM mode light is coupled into the second waveguide core while TE mode light remains in the first waveguide core.

Figure 9:
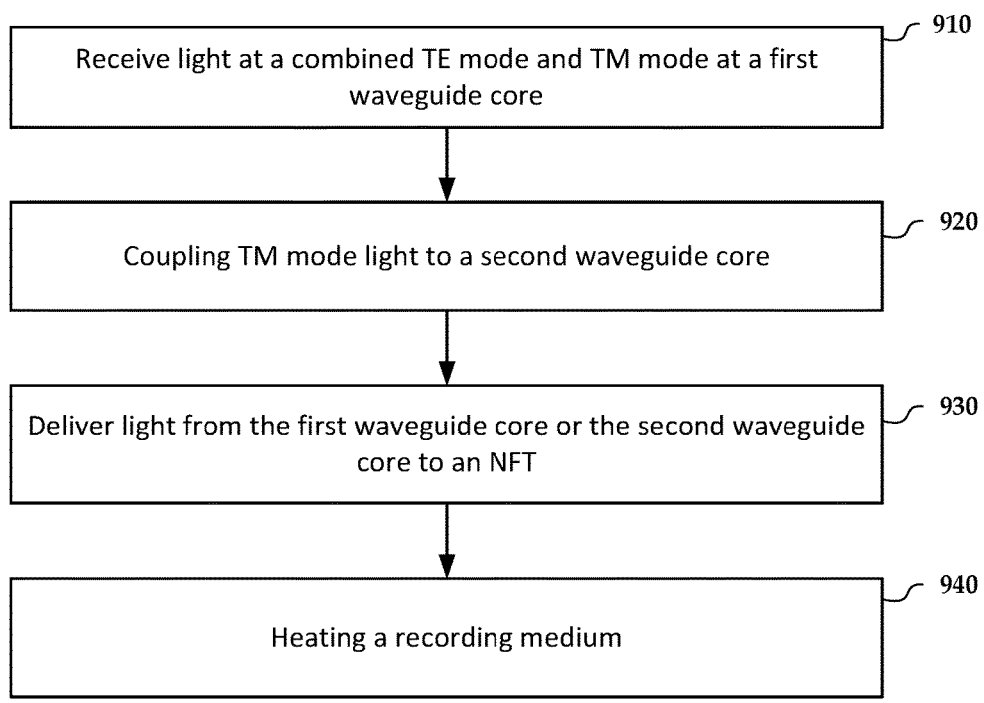
FIG. 9 illustrates a process that uses a first waveguide core and a second waveguide core in accordance with embodiments described herein.

FIG. 9 illustrates a process that includes a first waveguide core and a second waveguide core in accordance with embodiments described herein. Light is received 910 from a light source at a combined TE mode and a TM mode. TM mode light is coupled 920 to a second waveguide core while the TE mode light remains in the first waveguide core. According to various embodiments, the second waveguide core is spaced apart from the first waveguide core. Light is delivered 930 from the first waveguide core or the second waveguide core to an NFT at a media-facing surface of a write head. A magnetic recording medium is heated 940 in response to delivering the light to the NFT. According to various embodiments, the NFT receives substantially TE mode light from the first waveguide core or substantially TM mode light from the second waveguide core. For example, the NFT may receive light that is at least 90% TE mode from the first waveguide core or light that is at least 90% TM mode light from the second waveguide core.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:
1. An apparatus comprising:
a first waveguide core extending along a light-propagation direction and configured to receive light from a light source at a combined transverse electric (TE) mode and a transverse magnetic (TM) mode;
a second waveguide core spaced apart from the first waveguide core by a gap, the second waveguide core configured to couple light at a TM mode to the second waveguide core, the gap having a width that is substantially constant along an entire length of the second waveguide core; and
a near-field transducer (NFT) at a media-facing surface of a write head, the NFT receiving the light from the first waveguide core or the second waveguide core and heating a magnetic recording medium in response thereto.

2. The apparatus of claim 1, wherein the second waveguide core is spaced apart from the first waveguide core by a gap that increases in width along the light propagation direction.

3. The apparatus of claim 1, wherein the NFT receives substantially TM mode light from the second waveguide core.

4. The apparatus of claim 1, wherein at least one of the first waveguide core and the second waveguide core comprises a curve.

5. The apparatus of claim 1, wherein at least one of the first waveguide core and the second waveguide core comprises TaOx.

6. The apparatus of claim 1, wherein the first waveguide core has a different cross-sectional width than that of the second waveguide core.

7. The apparatus of claim 1, wherein the first waveguide core has a smaller cross-sectional width than that of the second waveguide core.

8. The apparatus of claim 1, further comprising one or more cladding layers surrounding the first waveguide core and the second waveguide core.

9. The apparatus of claim 1, wherein, the light output from the second waveguide core is at least 90% TM mode.

10. A method comprising:
receiving light from a light source at a combined transverse electric (TE) mode and a transverse magnetic (TM) mode;
coupling TM mode light to a second waveguide core from the first waveguide core, the second waveguide core spaced apart from the first waveguide core by a gap having a width that is substantially constant along an entire length of the second waveguide core;
delivering light received from the first waveguide core or the second waveguide core to a near-field transducer (NFT) at a media-facing surface of a write head; and
heating a magnetic recording medium in response to delivering the light.

11. The method of claim 10, wherein the NFT receives substantially TE mode light from the first waveguide core or substantially TM mode light from the second waveguide core.

12. The method of claim 11, wherein, the NFT receives light that is at least 90% TE mode from the first waveguide core or light that is at least 90% TM mode light from the second waveguide core.

13. An apparatus comprising:
a first waveguide core extending along a light-propagation direction and configured to receive light from a light source at a combined transverse electric (TE) mode and a transverse magnetic (TM) mode;
a second waveguide core spaced apart from the first waveguide core, the second waveguide core configured to couple light at a TM mode to the second waveguide core from the first waveguide core, an input end of the second waveguide core curving away from the first waveguide core; and a near-field transducer (NFT) at a media-facing surface of a write head, the NFT receiving substantially TM mode light from the second waveguide core and heating a magnetic recording medium in response thereto.

14. The apparatus of claim 13, wherein at least one of the first waveguide core and the second waveguide core comprises a curve.

15. The apparatus of claim 13, wherein the first waveguide core has a smaller cross-sectional width than that of the second waveguide core.

16. The apparatus of claim 13, wherein the second waveguide core is spaced apart from the first waveguide core by a gap that increases in width along the light propagation direction.

17. The apparatus of claim 13, further comprising one or more cladding layers surrounding the first waveguide core and the second waveguide core.

18. The apparatus of claim 13, wherein the NFT receives light that is at least 90% TM mode light from the second waveguide core.

19. The apparatus of claim 13, wherein at least one of the first waveguide core and the second waveguide core comprises an s-bend at a terminal end.

20. The apparatus of claim 13, wherein the first waveguide core comprises a first s-bend and the second waveguide core comprises a second s-bend, the first and second s-bends having substantially the same width.

* * * * *